US012001595B2

(12) United States Patent
Mallick et al.

(10) Patent No.: US 12,001,595 B2
(45) Date of Patent: Jun. 4, 2024

(54) END-TO-END ENCRYPTION OF LOGICAL STORAGE DEVICES IN A LINUX NATIVE MULTI-PATHING ENVIRONMENT

(71) Applicant: Dell Products L.P., Round Rock, TX (US)

(72) Inventors: Sanjib Mallick, Bangalore (IN); Gopinath Marappan, Coimbatore (IN); Kundan Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 404 days.

(21) Appl. No.: 17/541,381

(22) Filed: Dec. 3, 2021

(65) Prior Publication Data

US 2023/0177220 A1 Jun. 8, 2023

(51) Int. Cl.
*G06F 21/78* (2013.01)
*G06F 3/06* (2006.01)
*G06F 21/60* (2013.01)

(52) U.S. Cl.
CPC .......... *G06F 21/78* (2013.01); *G06F 3/0623* (2013.01); *G06F 3/0635* (2013.01);
(Continued)

(58) Field of Classification Search
CPC ...... G06F 21/78; G06F 3/0623; G06F 3/0635; G06F 3/0659; G06F 3/0679; G06F 21/602; G06F 3/067; G06F 3/0688
See application file for complete search history.

(56) References Cited

U.S. PATENT DOCUMENTS 6,567,397 B1 5/2003 Campana et al.
6,687,746 B1 2/2004 Shuster et al.
(Continued)

FOREIGN PATENT DOCUMENTS

CN 103677927 B 2/2017
CN 111813330 B * 9/2022 ......... G06F 13/1642
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Mohammed Waliullah
(74) *Attorney, Agent, or Firm* — Ryan, Mason & Lewis, LLP

(57) ABSTRACT

An apparatus comprises at least one processing device comprising a processor coupled to a memory, with the at least one processing device being configured to provide at least a portion of an input-output (IO) stack for processing of IO operations in a host device for delivery to a storage system over selected ones of a plurality of paths through a network. The IO stack comprises at least a multi-path device overlying one or more logical storage devices. The at least one processing device is further configured to perform a check at each of one or more points in the IO stack to confirm that a given IO operation directed to a given device of the IO stack is received from an expected overlying device of the IO stack. The IO stack illustratively comprises an encryption device overlying the multi-path device, supporting end-to-end encryption for one or more logical storage devices.

20 Claims, 5 Drawing Sheets

(52) U.S. Cl.
CPC .......... *G06F 3/0659* (2013.01); *G06F 3/0679* (2013.01); *G06F 21/602* (2013.01)

(56) References Cited

U.S. PATENT DOCUMENTS

| | | | |
|---|---|---|---|
| 6,697,875 | B1 | 2/2004 | Wilson |
| 7,003,527 | B1 | 2/2006 | Lavallee et al. |
| 7,275,103 | B1 | 9/2007 | Thrasher et al. |
| 7,397,788 | B2 | 7/2008 | Mies et al. |
| 7,454,437 | B1 | 11/2008 | Lavallee et al. |
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 8,250,256 | B2 | 8/2012 | Ghosalkar et al. |
| 8,285,825 | B1 | 10/2012 | Nagaraj et al. |
| 8,819,307 | B1 | 8/2014 | Raizen et al. |
| 8,825,919 | B1 | 9/2014 | Lim et al. |
| 8,832,334 | B2 | 9/2014 | Okita |
| 8,874,746 | B1 | 10/2014 | Gonzalez |
| 8,959,249 | B1 | 2/2015 | Love |
| 9,026,694 | B1 | 5/2015 | Davidson et al. |
| 9,201,803 | B1 | 12/2015 | Derbeko et al. |
| 9,400,611 | B1 | 7/2016 | Raizen |
| 9,430,368 | B1 | 8/2016 | Derbeko et al. |
| 9,594,780 | B1 | 3/2017 | Esposito et al. |
| 9,647,933 | B1 | 5/2017 | Tawri et al. |
| 9,672,160 | B1 | 6/2017 | Derbeko et al. |
| 9,712,613 | B2 | 7/2017 | Balasubramanian et al. |
| 9,778,852 | B1 | 10/2017 | Marshak et al. |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,369 | B1 | 12/2019 | Mallick et al. |
| 10,523,513 | B2 | 12/2019 | Bennett et al. |
| 10,606,496 | B1 | 3/2020 | Mallick et al. |
| 10,637,917 | B2 | 4/2020 | Mallick et al. |
| 10,652,206 | B1 | 5/2020 | Pusalkar et al. |
| 10,754,572 | B2 | 8/2020 | Kumar et al. |
| 10,757,189 | B2 | 8/2020 | Mallick et al. |
| 10,764,371 | B2 | 9/2020 | Rao et al. |
| 10,789,006 | B1 | 9/2020 | Gokam et al. |
| 10,817,181 | B2 | 10/2020 | Mallick et al. |
| 10,838,648 | B2 | 11/2020 | Sharma et al. |
| 10,880,217 | B2 | 12/2020 | Mallick et al. |
| 10,884,935 | B1 | 1/2021 | Doddaiah |
| 10,911,402 | B2 | 2/2021 | Pusalkar et al. |
| 11,050,660 | B2 | 6/2021 | Rao et al. |
| 11,093,155 | B2 | 8/2021 | Anchi et al. |
| 11,106,381 | B2 | 8/2021 | Rao et al. |
| 11,467,906 | B2* | 10/2022 | Doddaiah ........... G06F 11/1464 |
| 2001/0054093 | A1 | 12/2001 | Iwatani |
| 2002/0023151 | A1 | 2/2002 | Iwatani |
| 2002/0103923 | A1 | 8/2002 | Cherian et al. |
| 2003/0179227 | A1 | 9/2003 | Ahmad et al. |
| 2003/0195956 | A1 | 10/2003 | Bramhall et al. |
| 2003/0208581 | A1 | 11/2003 | Behren et al. |
| 2004/0010563 | A1 | 1/2004 | Forte et al. |
| 2004/0057389 | A1 | 3/2004 | Klotz et al. |
| 2004/0073648 | A1 | 4/2004 | Tanino et al. |
| 2004/0081186 | A1 | 4/2004 | Warren et al. |
| 2006/0026346 | A1 | 2/2006 | Kadoiri et al. |
| 2006/0036736 | A1 | 2/2006 | Kitamura et al. |
| 2006/0106819 | A1 | 5/2006 | Dhanadevan et al. |
| 2006/0129876 | A1 | 6/2006 | Uemura |
| 2006/0277383 | A1 | 12/2006 | Hayden et al. |
| 2007/0174849 | A1 | 7/2007 | Cheung et al. |
| 2007/0239989 | A1 | 10/2007 | Barnett et al. |
| 2007/0242617 | A1 | 10/2007 | Ichimura |
| 2007/0294563 | A1 | 12/2007 | Bose |
| 2008/0043973 | A1 | 2/2008 | Lai et al. |
| 2008/0147893 | A1 | 6/2008 | Marripudi et al. |
| 2008/0201458 | A1 | 8/2008 | Salli |
| 2008/0244174 | A1 | 10/2008 | Abouelwafa et al. |
| 2008/0256223 | A1* | 10/2008 | Chan ................... H04L 67/1008 709/223 |
| 2008/0301332 | A1 | 12/2008 | Butler et al. |
| 2009/0006780 | A1 | 1/2009 | Sato et al. |
| 2009/0172666 | A1* | 7/2009 | Yahalom ................. G06F 3/067 718/1 |
| 2009/0259749 | A1 | 10/2009 | Barrett et al. |
| 2009/0282135 | A1 | 11/2009 | Ravindran et al. |
| 2009/0307522 | A1* | 12/2009 | Olson ................. G06F 11/2007 714/E11.178 |
| 2010/0131950 | A1 | 5/2010 | Yamada et al. |
| 2010/0313063 | A1 | 12/2010 | Venkataraja et al. |
| 2011/0161520 | A1 | 6/2011 | Horiuchi et al. |
| 2011/0197027 | A1 | 8/2011 | Balasubramanian et al. |
| 2011/0296230 | A1 | 12/2011 | Chen et al. |
| 2012/0102369 | A1 | 4/2012 | Hiltunen et al. |
| 2012/0163374 | A1 | 6/2012 | Shah et al. |
| 2012/0246345 | A1 | 9/2012 | Contreras et al. |
| 2013/0019001 | A1 | 1/2013 | Winokur |
| 2013/0046892 | A1 | 2/2013 | Otani |
| 2013/0117766 | A1 | 5/2013 | Bax et al. |
| 2013/0121161 | A1 | 5/2013 | Szabo et al. |
| 2013/0339551 | A1 | 12/2013 | Flanagan et al. |
| 2014/0105068 | A1 | 4/2014 | Xu |
| 2015/0089015 | A1 | 3/2015 | Rosset et al. |
| 2015/0222705 | A1 | 8/2015 | Stephens |
| 2015/0242134 | A1 | 8/2015 | Takada et al. |
| 2015/0319245 | A1 | 11/2015 | Nishihara et al. |
| 2016/0050277 | A1 | 2/2016 | Kirk et al. |
| 2016/0092136 | A1 | 3/2016 | Balakrishnan et al. |
| 2016/0117113 | A1 | 4/2016 | Li et al. |
| 2016/0246749 | A1 | 8/2016 | Kobashi |
| 2016/0335003 | A1 | 11/2016 | Ahmed et al. |
| 2016/0380804 | A1 | 12/2016 | Amano |
| 2017/0134220 | A1 | 5/2017 | Chen et al. |
| 2017/0220406 | A1 | 8/2017 | Parnell et al. |
| 2017/0235507 | A1 | 8/2017 | Sinha et al. |
| 2018/0004425 | A1 | 1/2018 | Suzuki |
| 2018/0026863 | A1 | 1/2018 | Hughes et al. |
| 2018/0189635 | A1 | 7/2018 | Olarig et al. |
| 2018/0253256 | A1 | 9/2018 | Bharadwaj |
| 2018/0317101 | A1 | 11/2018 | Koue |
| 2019/0020603 | A1 | 1/2019 | Subramani et al. |
| 2019/0095299 | A1 | 3/2019 | Liu et al. |
| 2019/0108888 | A1 | 4/2019 | Sarkar et al. |
| 2019/0319846 | A1 | 10/2019 | Dhanadevan et al. |
| 2019/0334987 | A1 | 10/2019 | Mallick et al. |
| 2020/0021653 | A1 | 1/2020 | Rao et al. |
| 2020/0021654 | A1 | 1/2020 | Rao et al. |
| 2020/0097203 | A1 | 3/2020 | Mallick et al. |
| 2020/0106698 | A1 | 4/2020 | Rao et al. |
| 2020/0110552 | A1 | 4/2020 | Kumar et al. |
| 2020/0112608 | A1 | 4/2020 | Patel et al. |
| 2020/0192588 | A1 | 6/2020 | Kumar et al. |
| 2020/0204475 | A1 | 6/2020 | Mallick et al. |
| 2020/0204495 | A1 | 6/2020 | Mallick et al. |
| 2020/0213274 | A1 | 7/2020 | Pusalkar et al. |
| 2020/0241890 | A1 | 7/2020 | Mallick et al. |
| 2020/0314218 | A1 | 10/2020 | Kumar et al. |
| 2020/0348860 | A1 | 11/2020 | Mallick et al. |
| 2020/0348861 | A1 | 11/2020 | Marappan et al. |
| 2020/0348869 | A1 | 11/2020 | Gokam |
| 2020/0349094 | A1 | 11/2020 | Smith et al. |
| 2020/0363985 | A1 | 11/2020 | Gokam et al. |
| 2020/0372401 | A1 | 11/2020 | Mallick et al. |
| 2021/0019054 | A1 | 1/2021 | Anchi et al. |
| 2021/0026551 | A1 | 1/2021 | Tidke et al. |
| 2021/0026650 | A1 | 1/2021 | Rao et al. |
| 2021/0157502 | A1 | 5/2021 | Rao et al. |
| 2021/0181965 | A1 | 6/2021 | Anchi et al. |

(56) References Cited

U.S. PATENT DOCUMENTS

FOREIGN PATENT DOCUMENTS

| EP | 1117028 | A2 |   | 7/2001 | | |
| EP | 2667569 | A1 | * | 11/2013 | ........... | G06F 3/0613 |
| EP | 2667569 | A1 |   | 11/2013 | | |
| WO | PCT/US2019/052549 | | | 12/2019 | | |
| WO | PCT/US2019/053204 | | | 12/2019 | | |
| WO | PCT/US2019/053473 | | | 12/2019 | | |
| WO | PCT/US2019/067144 | | | 5/2020 | | |

OTHER PUBLICATIONS

NVM Express, "NVM Express, Revision 1.3," NVM Express, May 1, 2017, 282 pages.
VMware, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
Wikipedia, "Fibre Channel Zoning," https://en.wikipedia.org/wiki/Fibre_Channel_zoning, Aug. 19, 2020, 2 pages.
E. Smith, "Introducing Target Driven Zoning (TDZ)" https://brasstacksblog.typepad.com/brass-tacks/2012/01/introducing-target-driven-zoning-tdz.html, Jan. 16, 2012, 9 pages.
Broadcom, "Fabric Operating System 9.0," Technical Brief, Fabric Notifications, FOS-90-Fabric-Notifications-OT101, Nov. 4, 2020, 12 pages.
Brocade, "Brocade Guide to Undertanding Zoning," vol. 1, 2002, 27 pages.
A. Wasson, "General Rules and Limits for Auto-Provisioning on Symmetric VMAX," http://community.emc.com/docs/DOC-16553, May 8, 2012, 2 pages.
E. Goggin et al., "Linux Multipathing," Proceedings of the Linux Symposium, vol. 1, 2005, 21 pages.
K. Ueda et al., "Request-based Device-mapper Multipath and Dynamic Load Balancing," Proceedings of the Linux Symposium, vol. 2, 2007, 9 pages.
U.S. Appl. No. 17/151,302 filed in the name of Vinay G. Rao et al. filed Jan. 18, 2021, and entitled "Multi-Path Layer Configured for Detection and Mitigation of Slow Drain Issues in a Storage Area Network."
U.S. Appl. No. 17/177,821 filed in the name of Vinay G. Rao et al. filed Feb. 17, 2021, and entitled "Logical Storage Device Access in an Encrypted Storage Environment."
U.S. Appl. No. 17/195,894 filed in the name of Amit Pundalik Anchi et al. filed Mar. 9, 2021, and entitled "Logical Storage Device Access Using Datastore-Level Keys in an Encrypted Storage Environment."
U.S. Appl. No. 17/229,153 filed in the name of Tomer Shachar et al. filed Apr. 13, 2021, and entitled "Logical Storage Device Access Using Device-Specific Keys in an Encrypted Storage Environment."
U.S. Appl. No. 17/331,041 filed in the name of Amit Pundalik Anchi et al. filed May 26, 2021, and entitled "Logical Storage Device Access Using Device-Specific Keys in an Encrypted Storage Environment."
U.S. Appl. No. 17/375,641 filed in the name of Sanjib Mallick et al. filed Jul. 14, 2021, and entitled "Logical Storage Device Access Using per-VM Keys in an Encrypted Storage Environment."
U.S. Appl. No. 17/501,433 filed in the name of Gopinath Marappan et al. filed Oct. 14, 2021, and entitled "Non-disruptive Migration of Logical of Storage Devices in a Linux Native Multi-Pathing Environment."

* cited by examiner

END-TO-END ENCRYPTION OF LOGICAL STORAGE DEVICES IN A LINUX NATIVE MULTI-PATHING ENVIRONMENT

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. Various types of storage access protocols can be used by host devices to access logical units (LUNs) or other logical storage devices of the storage system, including by way of example Small Computer System Interface (SCSI) access protocols and Non-Volatile Memory Express (NVMe) access protocols. Such access protocols are typically utilized in conjunction with multi-pathing software on the host devices, where the multi-pathing software is associated with a particular multi-pathing environment such as a Linux native multi-pathing environment. However, it can be difficult to effectively provide adequate data security for LUNs and other logical storage devices in a Linux native multi-pathing environment. Accordingly, a need exists for improved techniques that can avoid such drawbacks of conventional approaches.

SUMMARY

Illustrative embodiments provide techniques for protecting LUNs or other logical storage devices from corruption in conjunction with end-to-end ("E2E") encryption in a Linux native multi-pathing environment or other type of multi-pathing environment, thereby ensuring effective data security for such devices.

In some embodiments, the disclosed end-to-end encryption techniques are implemented at least in part in a multi-path layer of at least one host device configured to communicate over a storage area network (SAN) with one or more storage arrays or other types of storage systems. One or more such embodiments provide highly efficient end-to-end encryption of logical storage devices while also avoiding potential corruption of logical storage device data in a Linux native multi-pathing environment, although the disclosed techniques can be utilized in other environments.

The multi-path layer illustratively comprises at least one multi-path input-output (MPIO) driver configured to process IO operations of at least one host device that communicates with one or more storage arrays or other types of storage systems over designated paths through a SAN or other type of network.

Other types of host drivers or other host device components can be used in place of or in addition to one or more MPIO drivers in implementing functionality for end-to-end encryption of logical storage devices as disclosed herein.

In an illustrative embodiment, an apparatus comprises at least one processing device that includes a processor and a memory, with the processor being coupled to the memory. The at least one processing device is configured to provide at least a portion of an IO stack for processing of IO operations in a host device for delivery to a storage system over selected ones of a plurality of paths through a network. The IO stack illustratively comprises at least a multi-path device overlying one or more logical storage devices. The at least one processing device is further configured to perform a check at each of one or more points in the IO stack to confirm that a given IO operation directed to a given device of the IO stack is received from an expected overlying device of the IO stack.

For example, in some embodiments, the IO stack illustratively comprises an encryption device overlying the multi-path device, and performing a check at each of one or more points in the IO stack comprises performing a check to confirm that a given IO operation directed to the multi-path device is received from the encryption device.

Additionally or alternatively, in some embodiments, the IO stack further comprises a first check module inserted in the IO stack between the encryption device and the multi-path device to perform a first check to determine if a given IO operation directed to the multi-path device is received from the encryption device, and a second check module inserted in the IO stack between the multi-path device and the one or more logical storage devices to perform a second check to determine if a given IO operation directed to at least one of the one or more logical storage devices is received from the multi-path device.

The at least one processing device illustratively comprises at least a portion of the host device. Other embodiments can include multiple host devices, with each such host device implementing similar functionality.

In some embodiments, the at least one processing device comprises at least one MPIO driver implemented in the host device and configured to control the delivery of the IO operations to the storage system over the selected ones of the plurality of paths through the network.

The MPIO driver of the host device in some embodiments comprises a device mapper MPIO driver operating in a Linux native multi-pathing environment.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
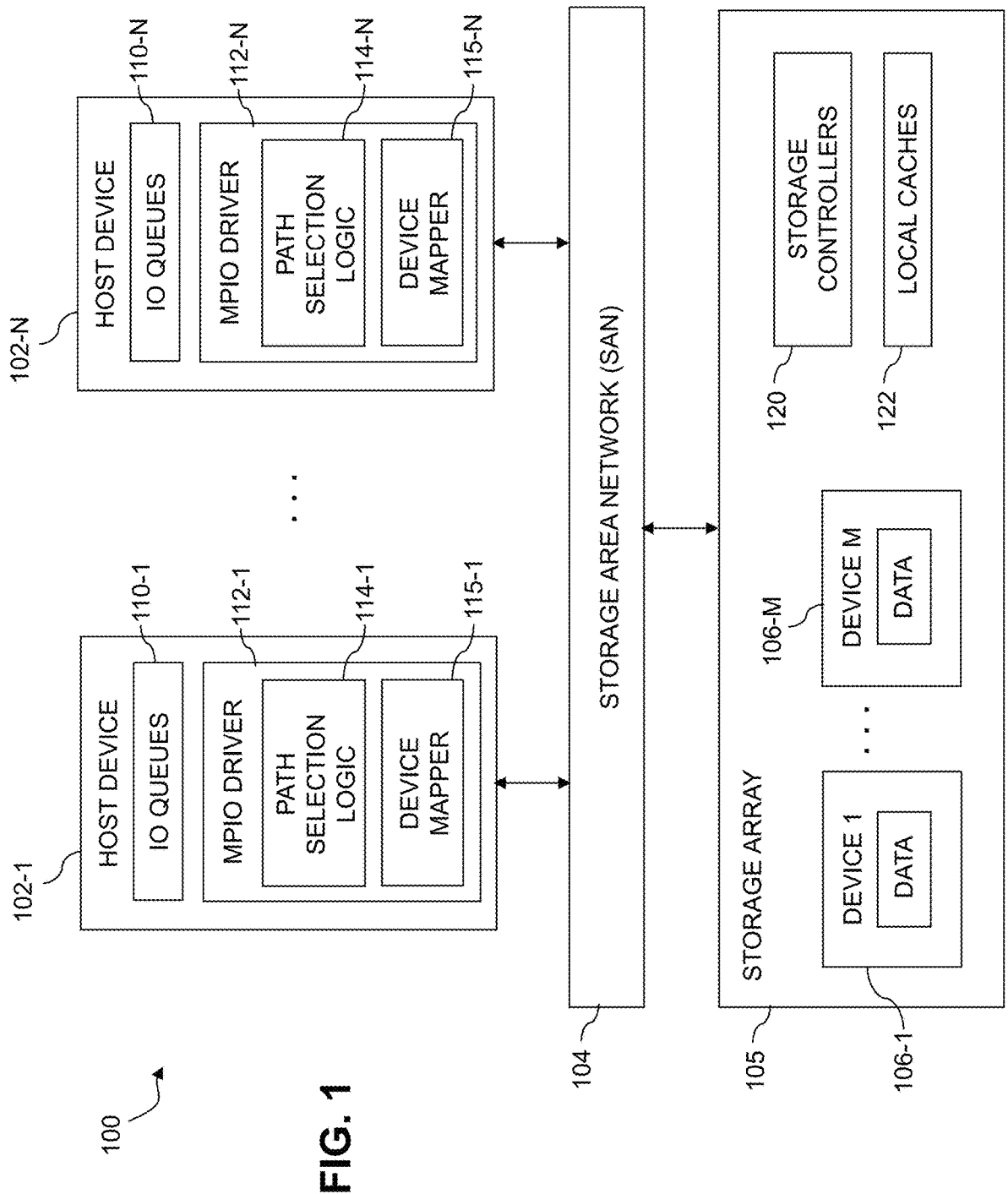
FIG. 1 is a block diagram of an information processing system configured with functionality for end-to-end encryption of logical storage devices in an illustrative embodiment.

FIG. 1 shows an information processing system 100 configured in accordance with an illustrative embodiment. The information processing system 100 comprises a plurality of host devices 102-1, ... 102-N. The host devices 102 communicate over a storage area network (SAN) 104 with at least one storage array 105. The SAN 104 in some embodiments illustratively comprises one or more switch fabrics. The storage array 105 comprises a plurality of storage devices 106-1, ... 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for end-to-end encryption of logical storage devices as disclosed herein. Such functionality is provided at least in part using respective instances of device mapper 115-1, . . . 115-N implemented within the MPIO drivers 112. An MPIO driver that includes or is otherwise associated with at least one such device mapper is also referred to herein as a device mapper MPIO driver.

The MPIO drivers 112 may comprise, for example, otherwise conventional MPIO drivers, such as Linux native multi-path drivers, suitably modified in the manner disclosed herein to provide functionality for end-to-end encryption of logical storage devices. Other types of MPIO drivers may be suitably modified to incorporate functionality for end-to-end encryption of logical storage devices as disclosed herein.

The host devices 102 can include additional or alternative components. For example, in some embodiments, the host devices 102 comprise respective local caches, implemented using respective memories of those host devices. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate, potentially leading to substantial mismatches in initiator and target negotiated rates for the same switch, set of switches or switch fabric of the SAN 104.

The term "negotiated rate" therefore illustratively comprises a rate negotiated between an initiator or a target and a switch of a switch fabric of SAN 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates, such as 1G, 2G, 4G, 8G, 16G, 32G, 64G and 128G, where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/sec, such as a rate of 85 MB/sec. Other negotiated rates referred to herein are denoted in terms of Gigabytes per second (GB/sec).

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

In some embodiments, the system 100 is configured in accordance with a layered system architecture that illustratively includes a host device processor layer, an MPIO layer, an HBA layer, a switch fabric layer, a storage array port layer and a storage array processor layer. The host device processor layer, the MPIO layer and the HBA layer are associated with at least a subset of the host devices 102, the switch fabric layer is associated with the SAN 104, and the storage array port layer and storage array processor layer are associated with the storage array 105. The storage array processors of the storage array processor layer may be viewed as examples of respective storage controllers 120 of the storage array 105.

Application processes of the host device processor layer generate IO operations that are processed by the MPIO layer for delivery to the storage array 105 over the SAN 104, which illustratively comprises one or more switch fabrics of the switch fabric layer. Paths are determined by instances of the path selection logic 114 for sending such IO operations to the storage array 105. More particularly, the path selection logic 114 determines appropriate paths over which to send particular IO operations to particular logical storage devices of the storage array 105. End-to-end encryption of logical storage devices is illustratively provided utilizing instances of device mapper 115 in the MPIO layer.

For example, in some embodiments, end-to-end encryption is illustratively provided for each of a plurality of logical storage devices, using cryptographic keys that are established for respective ones of the logical storage devices. A given such cryptographic key can comprise, for example, a symmetric key, an asymmetric key, a key of a private-public key pair, or another type of cryptographic key, as well as combinations of multiple keys, possibly associated with different layers of encryption in a multi-layer encryption arrangement. Encryption and decryption operations utilizing such keys are illustratively performed by an encryption device inserted in an IO stack, as described in more detail elsewhere herein. For example, data to be written to a logical storage device via an IO stack is illustratively encrypted by the encryption device of the IO stack, and data read from the logical storage device via the IO stack is illustratively decrypted by the encryption device of the IO stack. A wide variety of other types of end-to-end encryption can be used in other embodiments. Such end-to-end encryption is sometimes referred to as E2E encryption.

In some embodiments, cryptographic keys for respective logical storage devices are obtained from a Key Management Server (KMS). For example, a KMS in illustrative embodiments can supply keys to host devices 102 and possibly an associated host management system. One or more of the host devices 102 or the associated host management system can implement a FIPS-compliant client and/or agent that manages communication to the external KMS through a secure KMIP channel, where FIPS denotes Federal Information Processing Standards, and KMIP denotes Key Management Interoperability Protocol. A FIPS-compliant client and/or agent illustratively obtains one or more keys from the KMS for use in encrypting data in accordance with a cryptographic algorithm, such as an algorithm implementing the well-known Advanced Encryption Standard (AES) or other suitable cryptographic algorithm. Illustrative embodiments disclosed herein are not limited in terms of the particular types of keys and cryptographic algorithms that may be used in providing end-to-end encryption for logical storage devices.

The MPIO layer is an example of what is also referred to herein as a multi-path layer, and illustratively comprises one or more MPIO drivers 112 implemented in respective host devices 102. Each such MPIO driver illustratively comprises respective instances of path selection logic 114 and device mapper 115 configured as previously described. Additional or alternative layers and logic arrangements can be used in other embodiments.

As noted above, path selection logic 114 is configured to select different paths for sending IO operations from a given host device to storage array 105. These paths may include, for example, a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are mentioned by way of illustrative example only, and in many practical implementations there will typically be a much larger number of paths between the host devices 102 and the storage array 105, depending upon the specific system configuration and its deployed numbers of HBAs, switch fabrics and storage array ports. For example, each host device in the FIG. 1 embodiment can illustratively have a set of k paths to shared storage array 105, or alternatively different ones of the host devices 102 can have different numbers and types of paths to the storage array 105.

Some implementations of the system 100 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of IO host devices per port. The HBAs of the host devices are assumed to be zoned and masked to the storage array ports in accordance with the predicted performance needs, including user load predictions.

A given host device of system 100 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. Host multi-pathing software can be configured to facilitate end-to-end encryption of logical storage devices as disclosed herein. For example, multi-pathing software residing on one or more of the host devices 102 (e.g., a server such as an ESXi server or an AIX server) is utilized in illustrative embodiments to support end-to-end encryption of logical storage devices.

In the FIG. 1 embodiment, the storage array 105 comprises a plurality of storage controllers 120 and a plurality of local caches 122. For example, in some embodiments, each of the storage controllers 120 has a different local cache or a different allocated portion of a global cache associated therewith, each illustratively a "local cache" of its corresponding storage controller, as the term "local cache" is broadly used herein, although numerous alternative arrangements are possible. The storage controllers 120 can be implemented as respective storage processors, directors or other storage system components configured to control storage system operations relating to processing of IO operations.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection.

As indicated previously, problems can arise relating to data security in a Linux native multi-pathing environment. For example, it is possible in certain circumstances for data of one or more logical storage devices to become corrupted when attempting to provide end-to-end encryption in a Linux native multi-pathing environment.

Although OSs like Linux have a flexible data service infrastructure and a wide variety of different data services can be plugged into respective different layer in a block IO stack or other type of IO stack, this otherwise advantageous flexibility can present complications in the context of data security. For example, when implementing end-to-end encryption, there are a number of scenarios in which adequate protection is lacking under conventional approaches, including the following examples:

1. When adding a host and sharing a LUN across multiple hosts, a system administrator normally mounts a multi-path device. In the case of end-to-end encryption, the device to be mounted to the application should be an encryption device, and not a multi-path device. Under conventional practice, there is a significant likelihood that the mounted device may not be an encryption device.
2. When a snapshot is mounted for a LUN which is encrypted, the underlying multi-path device should be protected by an encryption service, and failing to do this can result in corruption of the LUN.
3. When a new data service is added between a multi-path layer and an encryption layer, the protection should be reinforced above the encryption layer for reasons similar to those identified above.
4. When writing data directly to a native device without using an encryption service (e.g., malware in the IO stack).

In these and other scenarios, conventional approaches often fail to provide adequate security, particularly in a Linux native multi-pathing environment.

For example, while access control mechanisms check user level access permissions, such mechanisms are insufficient to stop a valid user from inadvertently implementing a problematic misconfiguration of the type described above.

Illustrative embodiments advantageously overcome these and other drawbacks of conventional approaches.

For example, some embodiments avoid the problems of conventional practice by inserting one or more check modules within an IO stack of system 100 in a manner that avoids potential corruption of data in a Linux native multi-pathing environment. Such arrangements advantageously facilitate the deployment of effective end-to-end encryption for logical storage devices in a Linux multi-pathing environment, as well as in other types of multi-pathing environments.

In some embodiments, in conjunction with building an enterprise class business deployment for end-to-end encryption, a corruption prevention service is automatically plugged into the IO stack as part of the device stacking. This corruption prevention service in some embodiments is illustratively implemented as a special block IO driver that will be installed just above one or more data services which need protection. Such a block IO driver is an example of the above-noted check module, although numerous other types of check modules can be used in other embodiments.

For example, a "check module" as that term is broadly used herein can in some embodiments be implemented at least in part within another device of the IO stack. The IO stack in some embodiments comprises a block IO stack, but the term "IO stack" as used herein is intended to be broadly construed so as to encompass a wide variety of other stacking arrangements for processing IO operations from one or more applications.

A given IO stack in illustrative embodiments comprises a stacked arrangement of multiple devices, including at least one multi-path device and at least one native device, and possibly including other devices such as an encryption device arranged above the multi-path device in the IO stack. Devices of different types are also referred to herein as being associated with respective "layers" of the IO stack, and a given such layer can include one or more devices of the corresponding type.

Some of the embodiments to be described below specifically address a scenario involving an encryption service layer and a multi-pathing data service layer, and advantageously prevent corruption of the device due to an improper configuration.

As indicated previously, applications generate IO operations that are directed to devices. A native device, also sometimes referred to as a "basic device," generally represents a LUN, logical storage volume or other type of logical storage device that is a target of read IO and/or write IO of an application. There are also a number of special devices that provide functionality such as multi-pathing, encryption, logical volume manager (LVM), redundant array of independent disks (RAID), etc. These and additional or alternative devices are illustratively part of a given IO stack as that term is broadly used herein.

An example of a native device in the Linux OS is a device denoted /dev/sdX. Also, one or more special devices are formed on top of these native devices in a given IO stack. For example, in the case of multi-pathing functionality, Linux native multi-pathing software forms multi-path devices on top of native devices.

If an application performs IO to a multi-path device, then it leverages the functionality of the multi-pathing environment. Also, there may be encryption devices, where if an application performs IO to an encryption device, then the IO is encrypted and/or decrypted in accordance with the functionality of the encryption device. If an application needs both encryption and multi-pathing functionality, then the host device software implements a stacked approach in which an encryption device and a multi-path device are logically stacked within the IO stack. IO operations from the application are issued on an encryption device, the encryption device (created over the multi-path device) sends the IO operations to the multi-path device, and the multi-path device sends the IO operations to the native devices.

In this example of encryption enabled over a multi-path device, the multi-path device and the native devices are often not adequately protected against inadvertent misconfigurations of the type described previously. For example, the application can accidentally issue an IO operation to a multi-path device or a native device (e.g., a Linux/dev/sdX device), instead of to the encryption device. If the application accidentally issues a write IO to a multi-path device or a native device, then the data in the write IO will not be encrypted by the encryption device. If one or more such non-encrypted write IOs are issued in an IO stack that includes encryption and multi-path devices, data corruption in the native device will generally result.

Currently there is no sufficiently effective way to protect against these accidental writes. Illustrative embodiments herein overcome this problem by, for example, determining whether or not an incoming write is from an intended device, and then only allowing the IO to proceed responsive to an affirmative determination.

In some embodiments, every IO is accompanied by an IO done function pointer, illustratively providing functionality for an IO callback, more generally referred to herein as a "completion callback function." This IO callback in some embodiments is a feature or other type of function that is called when the IO completes. Every device in the IO stack illustratively embeds its own IO callback into the IO. As indicated previously, the devices in the IO stack are also referred to herein as corresponding to respective layers of the IO stack, with each such layer comprising one or more devices of a corresponding layer type, such as an encryption layer, a multi-path layer, or a logical storage device layer.

The above-noted IO done function pointer and IO callback arrangements are examples of what are more generally referred to herein as "completion callback functions." The term "completion callback function" as broadly used herein is intended to encompass IO done functions, IO callbacks and other types of IO completion indicator arrangements implemented using pointers or other features that are embedded into or otherwise associated with IO operations by devices in an IO stack. A "completion callback function" as that term is broadly used herein can therefore comprise, for example, a pointer or other feature, inserted in or otherwise associated with an IO operation, that directs one layer of an IO stack to provide information back to another layer of the IO stack.

Illustrative embodiments disclosed herein provide one or more check modules at each of one or more layers of the IO stack to determine for each IO whether or not the IO is coming from the correct previous layer or not. At the multi-path device level, such a module illustratively checks the IO to determine if it is coming from an encryption device. For example, in some embodiments, if the IO doesn't have an expected encrypt_io_callback feature, it is not coming from an encryption device, and therefore the check module can reject the IO as an IO that has inadvertently bypassed the encryption device of the IO stack. One or more other check modules can perform similar functionality relating to respective other overlying devices of the IO stack as well. Such an arrangement illustratively implements a check at each of one or more layers in a given IO stack that each IO is mandated to go through, in order to avoid potential corruption problems such as those identified previously. Although the checks are performed in some embodiments herein for write IOs, similar checks can be implemented for other types of IO operations.

It is assumed for some of the embodiments to be described that the MPIO drivers 112 of the host devices 102 comprise respective device mapper MPIO drivers operating in a Linux native multi-pathing environment. The MPIO drivers 112 illustratively comprise respective instances of device mapper 115. It is to be appreciated, however, that the disclosed techniques can be more generally applied to other environments, and accordingly should not be viewed as being limited to the Linux native multi-pathing environment.

In operation, the MPIO driver 112-1 is configured to control delivery of IO operations from its corresponding host device 102-1 to storage array 105 over selected ones of a plurality of paths through SAN 104, using its path selection logic 114-1, where the paths are associated with respective initiator-target pairs, the initiators being implemented on the host device 102-1 and the targets being implemented on the storage array 105.

The host device 102-1 provides at least a portion of an IO stack for processing of IO operations for delivery to one or more LUNs or other logical storage devices of the storage array 105 via the MPIO driver 112-1.

The IO stack illustratively comprises at least a multi-path device overlying one or more logical storage devices. In some embodiments, the MPIO driver 112-1 of the host device 102-1 comprises a device mapper MPIO driver operating in a Linux native multi-pathing environment, and the multi-path device illustratively comprises a request-based device in the Linux native multi-pathing environment. Other types of MPIO drivers and associated multi-path devices can be used in other embodiments. A given MPIO driver such as MPIO driver 112-1 illustratively has a plurality of multi-path devices associated therewith, each corresponding to one or more logical storage devices in a given IO stack of the host device 102-1.

The host device 102-1 in illustrative embodiments is configured to perform a check at each of one or more points in the IO stack to confirm that a given IO operation directed to a given device of the IO stack is received from an expected overlying device of the IO stack. As described previously, such checks advantageously avoid situations in which data of one or more logical storage devices might otherwise become corrupted due to inadvertent bypassing of one or more devices of the IO stack.

For example, a check module of the host device 102-1 may be configured to reject the given IO operation responsive to the check at one of the points indicating that the given JO operation was not received from the expected overlying device of the IO stack. The check module illustratively passes the given IO operation to an underlying device of the IO stack responsive to the check at one of the points indicating that the given IO operation was received from the expected overlying device of the IO stack.

In some embodiments, the IO stack comprises an encryption device overlying the multi-path device. Examples of such arrangements will be described in more detail below in conjunction with the IO stacks of FIGS. 3 and 4.

In such embodiments, performing a check at each of one or more points in the IO stack illustratively comprises performing a check to confirm that a given IO operation directed to the multi-path device is received from the encryption device.

The IO stack in some embodiments illustratively comprises a first check module inserted in the IO stack between the encryption device and the multi-path device to perform a first check to determine if a given IO operation directed to the multi-path device is received from the encryption device.

The IO stack illustratively further comprises a second check module inserted in the JO stack between the multi-path device and the one or more logical storage devices to perform a second check to determine if a given IO operation directed to at least one of the one or more logical storage devices is received from the multi-path device.

Numerous other IO stack and associated check module arrangements can be used in other embodiments. The term "check module" as used herein is intended to be broadly construed so as to encompass these and other arrangements. For example, in some embodiments, a given check module implements an algorithm of the type illustrated in FIG. 2, as will be described in more detail below.

In some embodiments, performing a check at each of one or more points in the IO stack illustratively comprises performing a check at each of the one or more points to confirm that the given IO operation at that point has associated therewith a completion callback function of the expected overlying device.

The absence of the completion callback function of the expected overlying device illustratively indicates that the given IO operation has bypassed the expected overlying device. For example, an application running on host device 102-1 may have inadvertently directed the given IO operation to the multi-path device of the IO stack in a manner that bypasses the encryption device of the IO stack, thereby creating a situation in which, absent use of the techniques disclosed herein, data corruption will likely result.

In some embodiments, each of at least a subset of the devices of the IO stack in processing a given IO operation embeds into the given IO operation a completion callback function of the given device prior to forwarding the given IO operation to an underlying device of the IO stack.

Additionally or alternatively, performing a check at each of one or more points in the IO stack in some embodiments comprises performing a first check at a first point in the IO stack to confirm that a given IO operation directed to the multi-path device includes a first completion callback function of the encryption device, and performing a second check at a second point different than the first point in the IO stack to confirm that the given IO operation directed to at least one of the one or more logical storage devices includes a second completion callback function of the multi-path device.

Encryption devices of the type described above are illustratively utilized to implement end-to-end encryption for logical storage devices accessible to the host device 102-1 via its MPIO driver 112-1.

At least a portion of such end-to-end encryption functionality is carried out by the device mapper 115-1 of the MPIO driver 112-1, in cooperation with the path selection logic 114-1. As indicated above, the MPIO driver 112-1 in the present embodiment is assumed to comprise a device mapper MPIO driver operating in a Linux native multi-pathing environment, although other MPIO drivers or host device components can be used.

The host device 102-1 is an example of what is more generally referred to herein as "at least one processing device" comprising a processor and a memory, with the processor being coupled to the memory. References herein to "at least one processing device" may instead comprise a portion of the host device 102-1, or at least a portion of multiple host devices 102, with each such host device implementing similar functionality. Other types of arrangements of one or more processing devices can be used to implement functionality for end-to-end encryption of logical storage devices as disclosed herein. For example, some embodiments may utilize an MPIO management station or other arrangement of one or more external servers to facilitate implementation of end-to-end encryption by the host devices 102.

As indicated previously, the paths over which IO operations are delivered from the host device 102-1 to the storage array 105 under the control of the MPIO driver 112-1 are assumed to be associated with respective initiator-target pairs, with the initiators of the initiator-target pairs illustratively comprising respective HBAs of the host device 102-1 and the targets of the initiator-target pairs illustratively comprising respective storage array ports of the storage array 105. Other types of paths involving other types of initiators and targets can be used in other embodiments.

Terms such as "initiator," "target" and "initiator-target pair" as used herein are therefore intended to be broadly construed.

Although described in the context of some embodiments as being performed by the MPIO driver 112-1 utilizing its path selection logic 114-1 and device mapper 115-1, one or more of the above-described operations in other embodiments can be performed elsewhere within the host device 102-1. Also, other ones of the MPIO drivers 112 and their respective other host devices 102 can be similarly configured.

An example of a process including operations of the type outlined above will be described below in conjunction with the flow diagram of FIG. 2. These and other operations referred to herein as being performed by one or more host devices operating in conjunction with one or more storage arrays of a storage system can in other embodiments involve additional or alternative system components, possibly including one or more external servers.

As noted above, the initiators of the initiator-target pairs illustratively comprise respective HBAs of the host device 102-1 and the targets of the initiator-target pairs comprise respective storage array ports of the storage array 105.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN 104 and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system involving virtual machines (VMs), where multiple VMs run on a single ESXi server with HBAs. All VMs are using all HBAs but there is a need to be able to distinguish which IO belongs to which VM, for example, in order to implement service level objectives (SLOs) between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of the host device 102-1 but have respective unique identifiers associated therewith. Additionally or alternatively, different ones of the multiple virtual initiators are illustratively associated with respective different ones of a plurality of virtual machines of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Aspects of end-to-end encryption of logical storage devices as disclosed herein are illustratively performed utilizing instances of device mapper 115 in respective ones of the MPIO drivers 112 of the multi-path layer, possibly operating in conjunction with their corresponding instances of path selection logic 114. However, it is to be appreciated that additional system components can participate in the disclosed functionality for end-to-end encryption of logical storage devices in illustrative embodiments. The term "end-to-end encryption" as used herein is intended to be broadly construed, so as to encompass a wide variety of additional or alternative arrangements for performing encryption and decryption operations on data of one or more LUNs or other logical storage devices.

These and other illustrative embodiments disclosed herein provide functionality for end-to-end encryption of logical storage devices, with at least portions of that functionality being implemented using one or more MPIO drivers of a multi-path layer of at least one host device. The MPIO drivers illustratively comprise Linux native multi-path drivers suitably modified to implement the techniques disclosed herein. Other types of host multi-pathing software can be similarly modified to implement the techniques disclosed herein. Again, MPIO drivers are not required, and other types of host drivers or more generally other host device components can be used.

As described above, in illustrative embodiments disclosed herein, the host devices 102 are configured to interact with storage array 105 to provide end-to-end encryption of logical storage devices between host devices 102 and storage array 105.

A detailed example of an algorithm performed by a given one of the host devices 102-1 utilizing its MPIO driver 112-1 and its corresponding instances of path selection logic 114-1 and device mapper 115-1 will now be described. In the following description, a host device is also referred to herein as simply a "host." Similarly, a storage array is also referred to herein as simply an "array."

Additional aspects of the Linux native multi-pathing environment in the context of the example algorithm illustratively include the following.

Terminology

DM Multipath ("dm-multipath"): Driver that provides native multi-pathing functionality in Linux.

DM Mirror ("dm-mirror"): Driver that provides mirroring functionality in Linux, also referred to as a "mirror device."

Device Mapper ("dm"): Framework provided by the Linux kernel for mapping physical block devices onto higher-level virtual block devices. Illustratively corresponds, for example, to device mapper 115-1 of MPIO driver 112-1.

DM Device ("dm device"): A virtual block device created by device mapper.

Block Layer: Part of Linux kernel which implements an interface that applications and file systems use to access various storage devices.

Block IO ("bio"): Smallest unit of IO in Linux block layer.

Request: A collection of bio that is coalesced to get better throughput from underlying layers.

Device Mapper Features

An example implementation of the device mapper 115-1 of the MPIO driver 112-1 in the Linux native multi-pathing environment illustratively has the following features:

1. For multi-pathing, dm-multipath along with device mapper creates a virtual block device (/dev/dm-<number>) for each LUN it manages. When an IO is sent to a dm-multipath device, internally it will be sent on any of the underlying native devices (e.g., /dev/sdX or /dev/nvmeXnY). By default, dm-multipath can accept "bio" or "request" as input from a layer above, but only dispatches "request" as output to the layer below, and so dm-multipath is generally considered a request-based device.

2. For mirroring, such as in the context of an LVM, dm-mirror along with device mapper also creates a virtual block device (/dev/dm-<number>). When an IO is sent to a dm-mirror device, internally it will be cloned to all the constituent underlying devices. The underlying devices can be other dm devices, native devices or even other types of block devices. The dm-mirror device can only accept "bio" from the layer above and dispatches "bio" to the layer below, and so dm-mirror is considered a bio-based device.

3. Device mapper allows stacking one dm device on top of another dm device as long as certain requirements are satisfied. One key requirement is that a bio-based dm device can be stacked on top of another bio-based or request-based device. But a request-based device can be stacked only on top of another request-based device.

4. Device mapper allows creation of new virtual devices on top of existing dm devices as long as the conditions in item 3 above are met.

In some embodiments, the host device OS provides different device layers and corresponding devices for special functionalities, such as multi-pathing and encryption. The application is free to issue IO on any desired device. As described previously, this can lead to issues when IO are issued to incorrect devices.

In some embodiments, a kernel module is implemented which is configured to protect devices from incorrect use. A user can utilize user space software to pass an IO control (IOCTL) system call to this kernel module. The IOCTL tells the kernel module about the device which needs to be protected. On receiving the device name, the kernel module replaces a function pointer in the IO path and inserts its own logic in the IO path of a device. This newly added logic starts checking the incoming IOs for the IO completion function pointers. If the IO completion function pointer is from the correct device then it allows the IO to proceed, and otherwise the new function of the kernel module returns an IO failure.

An example algorithm in an illustrative embodiment includes the following steps, although additional or alternative steps could be used in other embodiments:
1. User provides device name or major/minor number of a device from user space to the kernel module of a host device.
2. Kernel module looks up device and saves address of device IO entry function (e.g., old_io_entry_fn).
3. Kernel module replaces the device's IO entry function with a new one (e.g., new_check_io_entry_fn).

In some embodiments, the logic of the above-noted new_check_io_entry_fn is implemented as follows:
1. Perform a lookup for the previous layer's io_done function address and save it, as prev_layer_iodone=address_of_last_layer_iodone.
2. For each IO which arrives, traverse through the IO and check io_done pointer in IO. If the io_done pointer in IO is not equal to prev_layer_iodone then return an error, in accordance with the following code:

```
if(io->iodone != prev_layer_iodone)
    return IO_ERROR
else
    submit the IO to the downward layer.
```

Similar techniques are implemented for each of multiple devices and for each of the different types of layers. The above algorithm and associated code provides one example of a "check module" as that term is broadly used herein. Such a check module can be implemented as a stand-alone module that is inserted into an IO stack between two devices, or can be implemented as a component of a device in the IO stack.

Figure 3A:
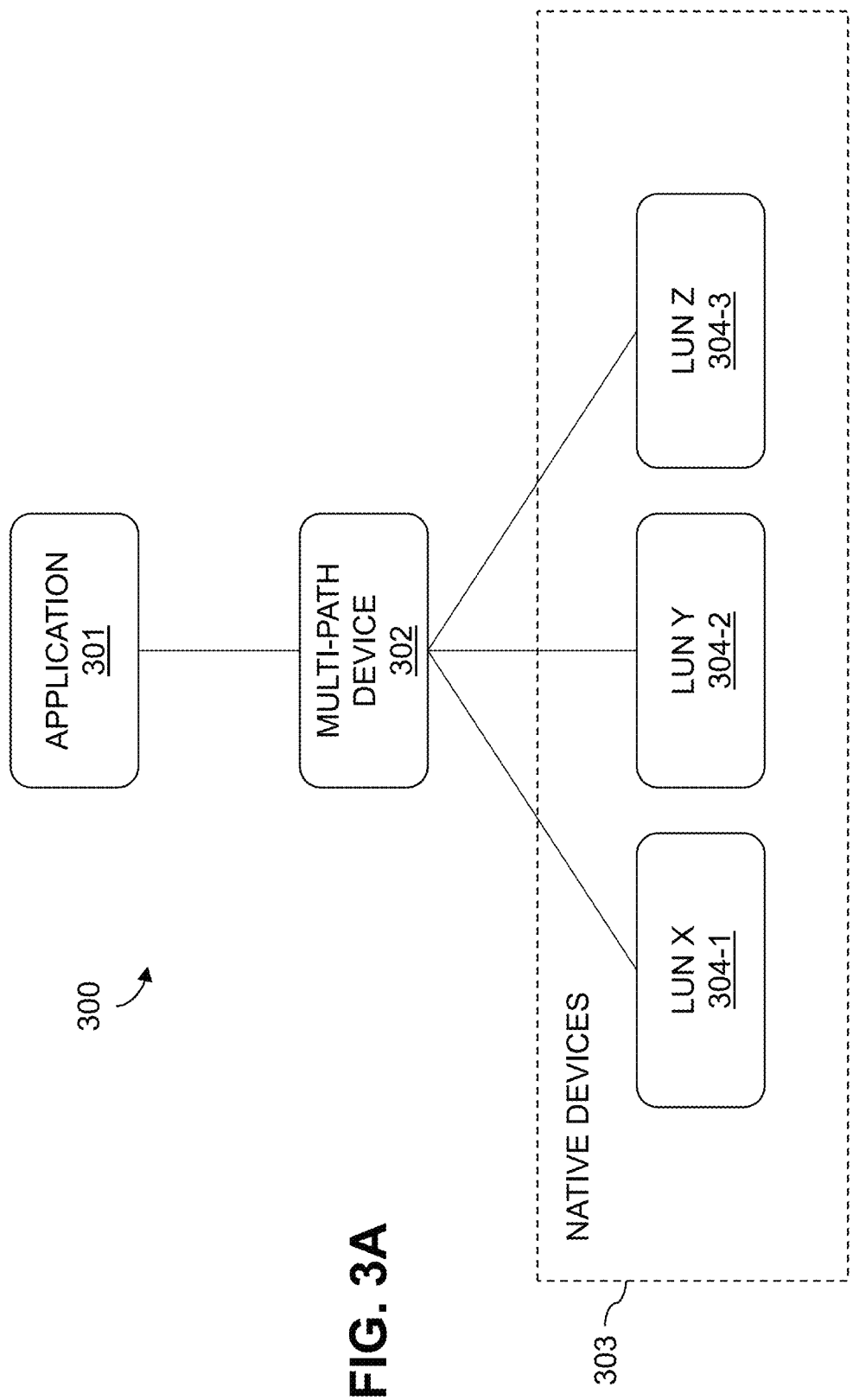
FIGS. 3A and 3B illustrate the insertion of multiple check modules in an example IO stack providing end-to-end encryption of logical storage devices in a Linux native multi-pathing environment in an illustrative embodiment. These figures are collectively referred to herein as FIG. 3.
Figure 3B:
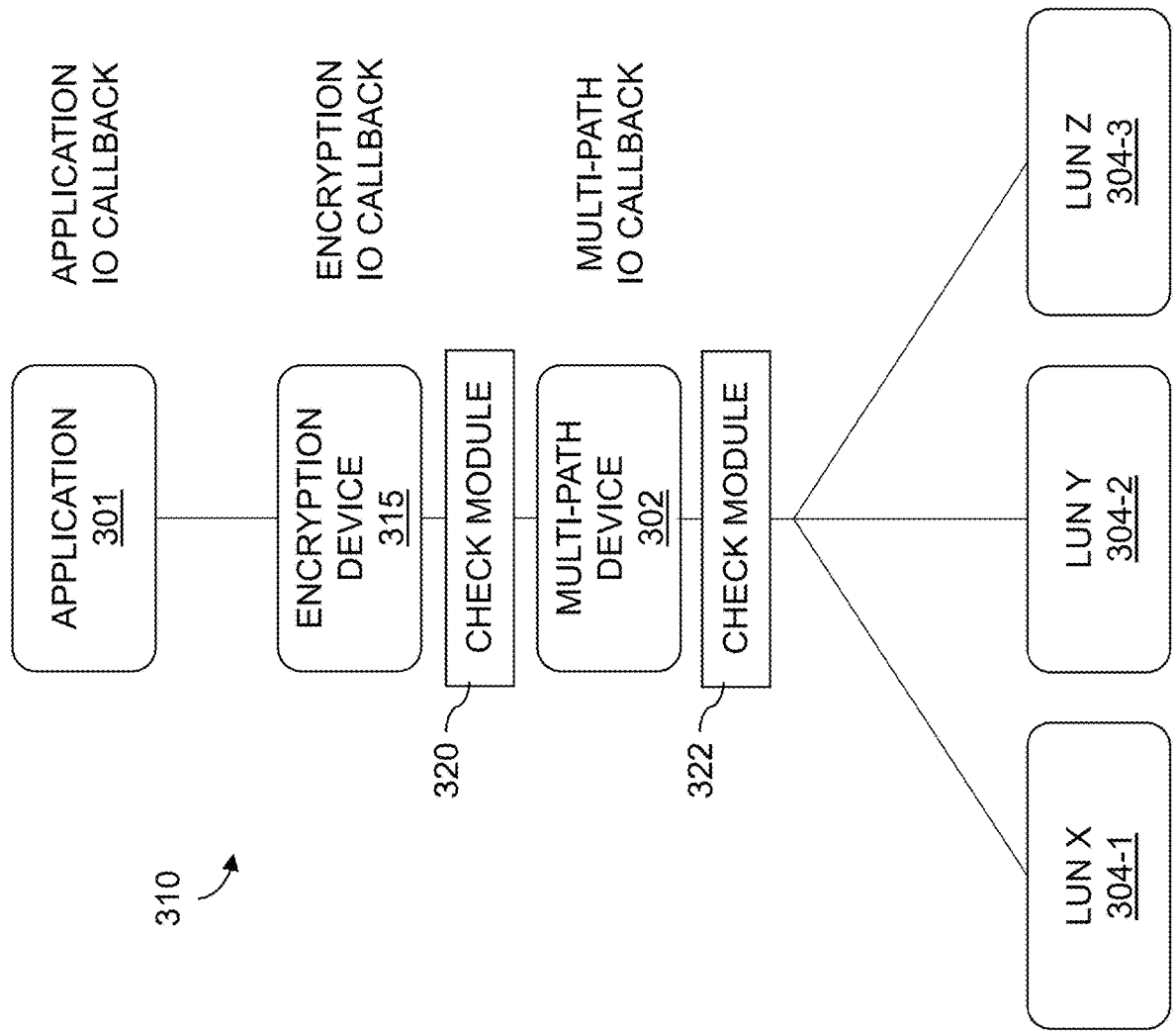
Figure 4:
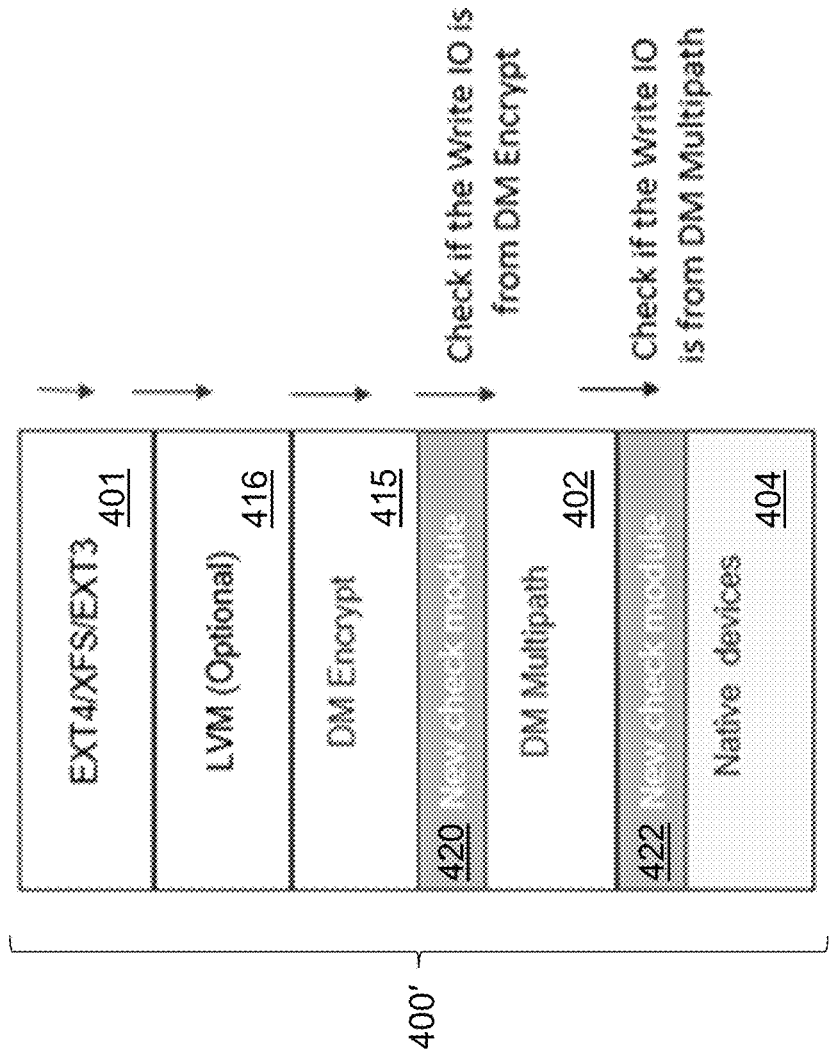
FIG. 4 shows the insertion of multiple check modules in another example IO stack providing end-to-end encryption of logical storage devices in a Linux native multi-pathing environment in another illustrative embodiment.
Figure 4:
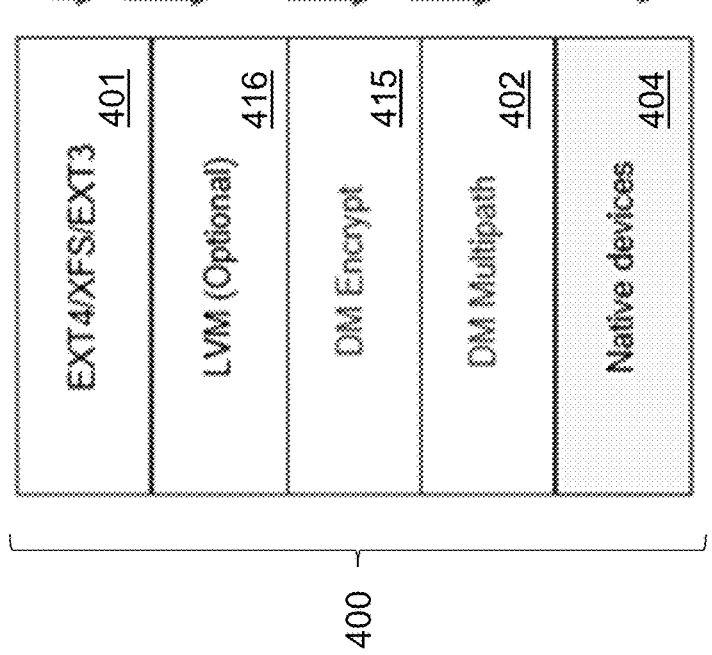

FIGS. 3 and 4 show examples of how the above-described check modules can be inserted between device layers of an IO stack in illustrative embodiments, although it is to be appreciated that a wide variety of different arrangements of layers and check modules can be used in other embodiments.

In some embodiments, the modules are inserted at the time of OS boot in order to protect the devices that require protection. The inserted modules in some embodiments herein are referred to as "IO protector modules."

Similar techniques can be applied in the context of other types of multi-pathing software, such as PowerPath® and numerous others, illustratively by replacing the IO entry points in the manner described above.

In some embodiments, in the event of insertion of a data service, the above-described protective mechanism is implemented at a level above the new service so that new service can also be protected.

For example, assume dm multi-path under dm encrypt is now protected by the above-described protective mechanism, and a new module (e.g., a new data service) is inserted. The protection can be implemented for the new module as follows:
1. Before inserting a new data service, stall IOs.
2. Insert new data service.
3. Do insert module ("insmod") to insert the previously-described IO protector module over the new data service by providing device name or major/minor number. The IO protector module illustratively goes one level up (just above the device corresponding to the new service), and operates as indicated above.
4. Resume IO.
5. Now the new data service is also protected under the encryption layer, in that IO which bypasses the encryption layer will be refused.

These and other embodiments disclosed herein can advantageously protect devices from being used in a manner that is susceptible to corruption.

The same logic can be used in multi-path software like PowerPath® to prevent data corruption, or to provide additional or alternative functionality, such as warning users of incorrect device usage.

In some embodiments, the disclosed techniques are implemented in a Linux native multi-pathing environment, using an encryption device arranged on top of a multi-path device in an IO stack. The device hierarchy of the IO stack in one or more such embodiments is illustratively as follows:

DM Encrypt Device<->DM Multipath Device<->Native Device.

The host device is illustratively configured with a kernel module in which the make_request_fn of the DM Multipath device was replaced with a new_make_request_fn. In the new_make_request_fn, the incoming IO was checked to determine if it had the completion pointer as "crypt_endio," and then only if the correct completion pointer was present did the new_make_request_fn allow the IO to succeed.

Such an arrangement protects the DM Multipath device, by allowing the IOs only if they are coming from the DM Encrypt device.

It is to be appreciated that the particular ordering and configuration of the algorithm steps and other features described in conjunction with the illustrative embodiments herein is exemplary only. Additional or alternative steps, possibly with a different ordering and/or partial overlap between certain steps, can be used.

Also, as indicated above, illustrative embodiments are not limited to use with a Linux native multi-pathing environment, but are more generally applicable to other types of multi-pathing environments, such as a PowerPath® multi-pathing environment, and associated storage access protocols.

The above example algorithms provide an efficient solution for end-to-end encryption in a Linux native multi-pathing environment.

It is to be appreciated that the particular steps of the algorithms described above and elsewhere herein are presented by way of illustrative example only, and additional or alternative steps can be used in other embodiments. Also, the order of the steps can be varied, and/or at least some of the steps can be performed at least in part in parallel with one another.

Illustrative embodiments can be implemented, for example, in one or more MPIO drivers of one or more host devices, with such MPIO drivers collectively providing a multi-path layer of the host devices.

For example, some embodiments are implemented though modification of otherwise conventional multi-pathing software, such as Linux native multi-pathing software. Other embodiments can be implemented in other MPIO drivers from various multi-pathing software vendors.

Illustrative embodiments disclosed herein can provide end-to-end encryption of logical storage devices for a wide variety of different types of host devices, such as host devices comprising ESXi servers or AIX servers.

At least portions of the above-described algorithms and other related techniques and functionality disclosed herein are illustratively implemented by a given MPIO driver on a corresponding host device, and similarly by other MPIO drivers on respective other host devices. Such MPIO drivers illustratively form a multi-path layer or MPIO layer comprising multi-pathing software of the host devices. Other types of multi-pathing software and host drivers can be used in other embodiments. Additionally or alternatively, other host device components can be used to implement at least portions of the disclosed functionality for end-to-end encryption of logical storage devices.

Additional examples of arrangements for end-to-end encryption of logical storage devices will be described elsewhere herein in conjunction with the embodiments of FIGS. 2, 3 and 4. Other types of arrangements for end-to-end encryption of logical storage devices can be used in other embodiments.

These and other functions related to end-to-end encryption of logical storage devices that are referred to herein as being performed by or under the control of the MPIO drivers 112 through interaction with the storage array 105 can in some embodiments be performed at least in part outside of MPIO drivers 112 utilizing other system components.

The above-described functions associated with end-to-end encryption of logical storage devices in the MPIO driver 112-1 in some embodiments are carried out at least in part under the control of its device mapper 115-1, illustratively operating in cooperation with path selection logic 114-1. For example, the device mapper 115-1 is illustratively configured to control performance of portions of an algorithm comprising the steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for end-to-end encryption of logical storage devices.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known multi-pathing software functionality, such as Linux native multi-pathing functionality. Such conventional multi-pathing software functionality is suitably modified in illustrative embodiments disclosed herein to support end-to-end encryption of logical storage devices.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system. Such a cloud-based system can additionally or alternatively be used to implement other portions of system 100, such as one or more of the host devices 102.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and device mapper 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
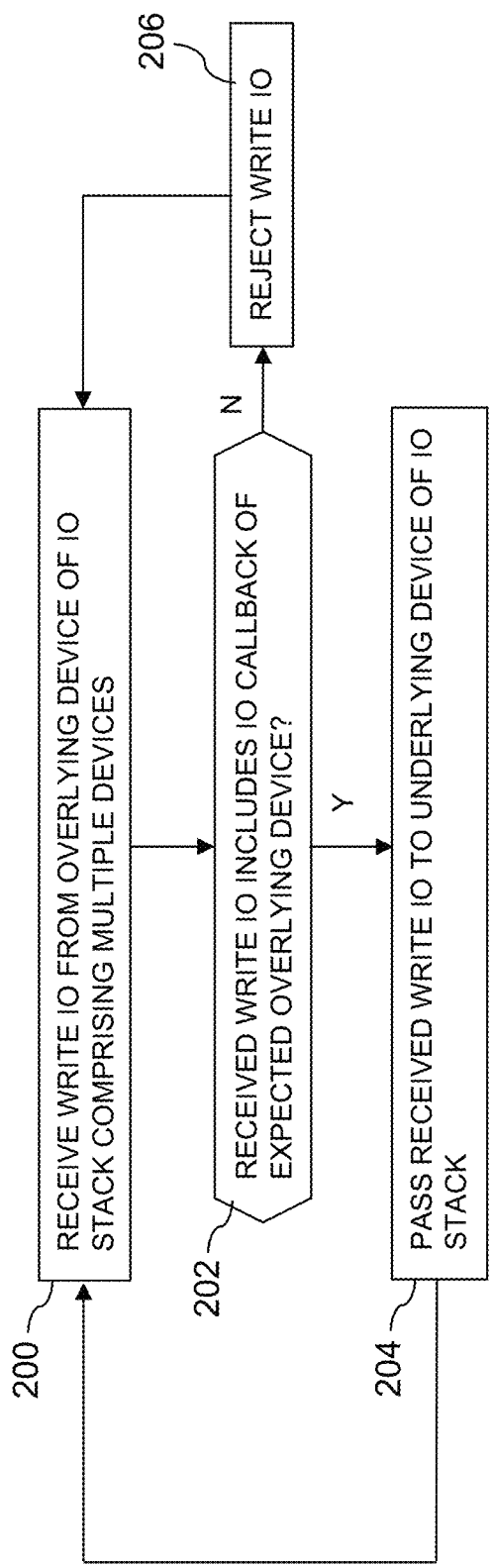
FIG. 2 is a flow diagram of an example check module algorithm implemented in an IO stack of the FIG. 1 system in an illustrative embodiment.

The steps of the FIG. 2 process are illustratively performed at least in part by or under the control of a multi-path layer comprising one or more MPIO drivers of respective host devices, cooperatively interacting with a storage array or other storage system, and possibly with some participation by one or more additional components such as an external server providing management functionality. Other arrangements of additional or alternative system components can be configured to perform at least portions of one or more of the steps of the FIG. 2 process in other embodiments.

The steps shown in FIG. 2 more specifically relate to processing performed by a given host device, also referred to herein as simply a "host," interacting with a storage array. It is assumed that similar processes are implemented for each of a plurality of additional hosts that interact with the storage array.

The FIG. 2 process generally provides an example algorithm implemented by a particular check module in an IO stack of a host device. In accordance with the algorithm, the check module performs a check at a particular point in the IO stack of the host to confirm that a given IO operation directed to a given device of the IO stack is received from an expected overlying device of the IO stack. The IO stack includes a multi-path device, and may include one or more additional devices, such as an encryption device overlying the multi-path device and configured to implement encryption functionality in support of end-to-end encryption of one or more logical storage devices of the storage array. One or more such devices of the IO stack are illustratively configured by an MPIO driver of the host, which is assumed to comprise a device mapper MPIO driver operating in a Linux native multi-pathing environment as described elsewhere herein. The multi-path device of the IO stack illustratively comprises a request-based device in the Linux native multi-pathing environment.

In step 200, a check module inserted in the IO stack receives a write IO from an overlying device of an IO stack comprising multiple devices, such as an encryption device overlying a multi-path device which is overlying one or more logical storage devices, also referred to as native devices.

In step 202, a determination is made by the check module as to whether or not the received write IO includes an IO callback of the expected overlying device. For example, if the check module is inserted between an encryption device and a multi-path device in the IO stack, the check module determines whether or not the received write IO includes an IO callback of the encryption device, which is an indication that the write IO has been properly processed by the encryption device. Similarly, if the check module is inserted between a multi-path device and a native device in the IO stack, the check module determines whether or not the received write IO includes an IO callback of the multi-path device, which is an indication that the write IO has been properly processed by the multi-path device. Responsive to an affirmative determination by the check module in step 202, the process moves to step 204, and otherwise moves to step 206, as indicated in the figure.

In step 204, the check module passes the received write IO to the underlying device of the IO stack, responsive to the affirmative determination in step 202. For example, if the check module is inserted between an encryption device and a multi-path device in the IO stack, the check module passes the received write IO to the multi-path device. Similarly, if the check module is inserted between a multi-path device and a native device in the IO stack, the check module passes the received write IO to the native device.

In step 206, the check module rejects the received write TO, thereby preventing its delivery to the underlying device of the IO stack, responsive to a negative determination in step 202. For example, if the check module is inserted between an encryption device and a multi-path device in the IO stack, the check module rejects the received write IO to prevent it from reaching the multi-path device. Similarly, if the check module is inserted between a multi-path device and a native device in the IO stack, the check module rejects the received write IO to prevent it from reaching the native device. This advantageously avoids problematic situations that could otherwise lead to data corruption in the manner described elsewhere herein.

After step 206, the process returns to step 200 to allow the check module to handle another received write IO. Separate instances of the FIG. 2 process can be performed by respective check modules inserted at respective different points in the IO stack. Also, although write IOs are referred to in this embodiment, other embodiments can perform similar checks at particular points in the IO stack for other types of IO operations.

In some embodiments, the check modules are assumed to be implemented as respective inter-layer check modules, arranged between devices corresponding to respective distinct layers of the IO stack. However, in other embodiments, at least portions of the functionality of a given check module can be implemented as an input preprocessing function or other portion of a particular device of the IO stack. For example, the check module can form an initial part of the processing of a multi-path device or a native device in some embodiments.

Accordingly, the term "check module" as used herein is intended to be broadly construed, and should not be viewed as being limited in any way to an inter-layer check module inserted between devices corresponding to different layers of an IO stack, such as between an encryption device and a multi-path device, or between a multi-path device and one or more native devices, in an end-to-end encryption arrangement.

It should be noted that the process as implemented by a given check module can include additional or alternative steps than those shown in the figure.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for end-to-end encryption of logical storage devices. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for end-to-end encryption of logical storage devices within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Referring now to FIG. 3, an example IO stack configured to provide end-to-end encryption of multiple native devices in a Linux native multi-pathing environment will be described. FIGS. 3A and 3B respectively show the IO stack with and without insertion of an encryption device and check modules of the type described previously.

With reference initially to FIG. 3A, an IO stack 300 without inserted encryption device and check modules comprises an application 301, a multi-path device 302, and a plurality of native devices 303 that more particularly comprise LUNs X, Y and Z also denoted as LUNs 304-1, 304-2 and 304-3, respectively.

The application 301 illustratively accesses LUNs 304-1, 304-2 and 304-3 via multi-path device 302. More particularly, IOs generated by application 301 are directed to one or more of LUNs 304-1, 304-2 and 304-3 over selected ones of the paths supported by the multi-path device 302.

In the FIG. 3A arrangement, the IO stack does not include an encryption service provided by an encryption device. Accordingly, in this arrangement, end-to-end encryption is not provided for the data of the LUNs 304-1, 304-2 and 304-3.

FIG. 3B illustrates the manner in which the IO stack 300 of FIG. 3A is modified to include an encryption device and check modules of the type disclosed herein, in order to provide secure, corruption-free, end-to-end encryption for the LUNs 304-1, 304-2 and 304-3. In this example, modified IO stack 310 includes an encryption device 315 inserted between the application 301 and the multi-path device 302. A first check module 320 is inserted between the encryption device 315 and the multi-path device 302, and a second check module 322 is inserted between the multi-path device 302 and the LUNs 304-1, 304-2 and 304-3.

The first check module 320 is configured to perform a first check to determine if a given IO directed to the multi-path device 302 is received from the encryption device 315, in accordance with a proper end-to-end encryption arrangement that eliminates the possibility of data corruption due to bypassing of a required device of the IO stack 310. The second check module 322 is configured to determine if a given IO directed to at least one of the LUNs 304-1, 304-2 and 304-3 is received from the multi-path device 302, again in accordance with a proper end-to-end encryption arrangement that eliminates the possibility of data corruption due to bypassing of a required device of the IO stack 310.

As shown in the figure, the different devices of the IO stack 310 have respective completion callback functions associated therewith, including an application IO callback associated with the application 301, an encryption IO callback associated with the encryption device 315, and a multi-path IO callback associated the multi-path device 302.

The check modules 320 and 322 in some embodiments are each configured to perform a check to confirm for each received IO operation that the received IO operation has associated therewith a completion callback function of the expected overlying device. The absence of the completion callback function of the expected overlying device illustratively indicates that the received IO operation has bypassed the expected overlying device. The check modules 320 and 322 can detect this condition, and reject any received IO operation that has not been processed by the expected overlying device of the IO stack 310, thereby eliminating potential data corruption that might otherwise arise in the end-to-end encryption arrangement. For each received IO operation that includes the appropriate completion callback function of the expected overlying device, the check module 320 or 322 forwards that IO operation to the underlying device of the IO stack 310.

FIG. 4 shows another example in which an IO stack 400 is modified to include multiple check modules of the type disclosed herein, to support end-to-end encryption of logical storage devices in a Linux native multi-pathing environment.

In this embodiment, the IO stack 410 prior to insertion of the check modules includes a file system 401, an LVM device 416, a DM Encrypt device 415, a DM Multipath device 402, and a plurality of native devices 404. The file system 401 illustratively comprises one or more of EXT4, XFS and/or EXT3, where EXT3, EXT4 and XFS denote different example file systems, although other types of file systems can be used in other embodiments. Also, although the LVM device 416 is illustratively denoted as optional in this embodiment, this should not be construed as an indication that other devices are required or mandatory in this embodiment or other embodiments. The arrows in the figure indicate the processing flow of an IO operation from the file system 401 to the native devices 404.

The modified IO stack 400' includes the devices and other components of the stack 400, but supplemented with a first check module 420 inserted between the DM Encrypt device 415 and the DM Multipath device 402, and a second check module 422 inserted between the DM Multipath device 402 and the native devices 404.

In the case of an example write IO associated with the file system 401, the first check module 420 is configured to check if the write IO is received from the DM Encrypt device 415, illustratively by determining if the write IO includes or is otherwise associated with the completion callback function of the DM Encrypt device 415, which would indicate that the write IO has been processed by the DM Encrypt device 415. Similarly, the second check module 422 is configured to check if the write IO is received from the DM Multipath device 402, illustratively by determining if the write IO includes or is otherwise associated with the completion callback function of the DM Multipath device 402, which would indicate that the write IO has been processed by the DM Multipath device 402.

The above-described processes, algorithms and other features and functionality disclosed herein are presented by way of illustrative example only, and other embodiments can utilize additional or alternative arrangements. For example, the layers and associated devices of the IO stacks and the manner in which the check modules are incorporated into the IO stacks can be varied in other embodiments.

Also, as mentioned previously, different instances of the above-described processes, algorithms and other techniques for end-to-end encryption of logical storage devices can be performed using different system components.

The particular arrangements described above for end-to-end encryption of logical storage devices are therefore presented by way of illustrative example only. Numerous alternative arrangements of these and other features can be used in implementing the end-to-end encryption of logical storage devices in other illustrative embodiments.

As indicated previously, the illustrative embodiments disclosed herein can provide a number of significant advantages relative to conventional arrangements.

For example, some embodiments are advantageously configured to provide highly efficient and effective end-to-end encryption of logical storage devices between host devices and a storage array or other storage system, while also avoiding potential data corruption that might otherwise occur if an encryption device of an IO stack were inadvertently or deliberately bypassed by one or more IO operations.

Illustrative embodiments provide particularly effective techniques for end-to-end encryption in a Linux native multi-pathing environment, but are suitable for use in other types of environments.

Various aspects of functionality associated with end-to-end encryption of logical storage devices as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and device mapper 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, storage controllers, processors, memories, IO queues, MPIO drivers, initiators, targets, path selection logic, device mappers, and additional or alternative components. Also, the particular configurations of system and device elements and associated processing operations illustratively shown in the drawings can be varied in other embodiments. For example, a wide variety of different host device and storage system configurations and associated arrangements for end-to-end encryption of logical storage devices can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to provide at least a portion of an input-output stack for processing of input-output operations in a host device for delivery to a storage system over selected ones of a plurality of paths through a network, the input-output stack comprising at least a multi-path device overlying one or more logical storage devices; and
to perform a check at each of one or more points in the input-output stack to confirm that a given input-output operation directed to a given device of the input-output stack is received from an expected overlying device of the input-output stack;
wherein the input-output stack comprises an encryption device overlying the multi-path device; and
wherein the check performed at a given one of the one or more points in the input-output stack relates at least in part to the encryption device.

2. The apparatus of claim 1 wherein the at least one processing device comprises at least a portion of the host device.

3. The apparatus of claim 1 wherein said at least one processing device comprises a multi-path input-output driver of the host device, with the multi-path input-output driver of the host device being configured to control the delivery of the input-output operations to the storage system over the selected ones of the plurality of paths through the network.

4. The apparatus of claim 3 wherein the multi-path input-output driver of the host device comprises a device mapper multi-path input-output driver operating in a Linux native multi-pathing environment.

5. The apparatus of claim 1 wherein the at least one processing device is further configured to reject the given input-output operation responsive to the check at one of the points indicating that the given input-output operation was not received from the expected overlying device of the input-output stack.

6. The apparatus of claim 1 wherein the at least one processing device is further configured to pass the given input-output operation to an underlying device of the input-output stack responsive to the check at one of the points indicating that the given input-output operation was received from the expected overlying device of the input-output stack.

7. The apparatus of claim 1 wherein performing a check at each of one or more points in the input-output stack comprises performing a check to confirm that a given input-output operation directed to the multi-path device is received from the encryption device.

8. The apparatus of claim 1 wherein the input-output stack comprises a first check module inserted in the input-output stack between the encryption device and the multi-path device to perform a first check to determine if a given input-output operation directed to the multi-path device is received from the encryption device.

9. The apparatus of claim 8 wherein the input-output stack comprises a second check module inserted in the input-output stack between the multi-path device and the one or more logical storage devices to perform a second check to determine if a given input-output operation directed to at least one of the one or more logical storage devices is received from the multi-path device.

10. The apparatus of claim 1 wherein each of at least a subset of the devices of the input-output stack in processing a given input-output operation embeds into the given input-output operation a completion callback function of the given device prior to forwarding the given input-output operation to an underlying device of the input-output stack.

11. The apparatus of claim 1 wherein performing a check at each of one or more points in the input-output stack comprises:
performing a first check at a first point in the input-output stack to confirm that a given input-output operation directed to the multi-path device includes a first completion callback function of the encryption device; and
performing a second check at a second point different than the first point in the input-output stack to confirm that the given input-output operation directed to at least one of the one or more logical storage devices includes a second completion callback function of the multi-path device.

12. An apparatus comprising:
at least one processing device comprising a processor coupled to a memory;
the at least one processing device being configured:
to provide at least a portion of an input-output stack for processing of input-output operations in a host device for delivery to a storage system over selected ones of a plurality of paths through a network, the input-output stack comprising at least a multi-path device overlying one or more logical storage devices; and
to perform a check at each of one or more points in the input-output stack to confirm that a given input-output operation directed to a given device of the input-output stack is received from an expected overlying device of the input-output stack;
wherein performing a check at each of one or more points in the input-output stack comprises performing a check at each of the one or more points to confirm that the given input-output operation at that point has associated therewith a completion callback function of the expected overlying device.

13. The apparatus of claim 12 wherein absence of the completion callback function of the expected overlying device indicates that the given input-output operation has bypassed the expected overlying device.

14. A computer program product comprising a non-transitory processor-readable storage medium having stored therein program code of one or more software programs, wherein the program code, when executed by at least one processing device comprising a processor coupled to a memory, causes the at least one processing device:

to provide at least a portion of an input-output stack for processing of input-output operations in a host device for delivery to a storage system over selected ones of a plurality of paths through a network, the input-output stack comprising at least a multi-path device overlying one or more logical storage devices; and to perform a check at each of one or more points in the input-output stack to confirm that a given input-output operation directed to a given device of the input-output stack is received from an expected overlying device of the input-output stack;

wherein the input-output stack comprises an encryption device overlying the multi-path device; and wherein the check performed at a given one of the one or more points in the input-output stack relates at least in part to the encryption device.

15. The computer program product of claim 14 wherein performing a check at each of one or more points in the input-output stack comprises performing a check to confirm that a given input-output operation directed to the multi-path device is received from the encryption device.

16. The computer program product of claim 14 wherein the input-output stack further comprises:

a first check module inserted in the input-output stack between the encryption device and the multi-path device to perform a first check to determine if a given input-output operation directed to the multi-path device is received from the encryption device; and a second check module inserted in the input-output stack between the multi-path device and the one or more logical storage devices to perform a second check to determine if a given input-output operation directed to at least one of the one or more logical storage devices is received from the multi-path device.

17. A method comprising:

providing at least a portion of an input-output stack for processing of input-output operations in a host device for delivery to a storage system over selected ones of a plurality of paths through a network, the input-output stack comprising at least a multi-path device overlying one or more logical storage devices; and performing a check at each of one or more points in the input-output stack to confirm that a given input-output operation directed to a given device of the input-output stack is received from an expected overlying device of the input-output stack;

wherein the input-output stack comprises an encryption device overlying the multi-path device; and wherein the check performed at a given one of the one or more points in the input-output stack relates at least in part to the encryption device.

18. The method of claim 17 wherein performing a check at each of one or more points in the input-output stack comprises performing a check to confirm that a given input-output operation directed to the multi-path device is received from the encryption device.

19. The method of claim 17 wherein the input-output stack further comprises:

a first check module inserted in the input-output stack between the encryption device and the multi-path device to perform a first check to determine if a given input-output operation directed to the multi-path device is received from the encryption device; and a second check module inserted in the input-output stack between the multi-path device and the one or more logical storage devices to perform a second check to determine if a given input-output operation directed to at least one of the one or more logical storage devices is received from the multi-path device.

20. The method of claim 17 wherein performing a check at each of one or more points in the input-output stack comprises performing a check at each of the one or more points to confirm that the given input-output operation at that point has associated therewith a completion callback function of the expected overlying device.

* * * * *